United States Patent Office

3,089,867
Patented May 14, 1963

3,089,867
PROCESS FOR THE MODIFICATION OF
OLEFIN POLYMERS
Calvin V. Smalheer, Gates Mills, and William M. Le Suer, Cleveland, Ohio, assignors to The Lubrizol Corp., Wickliffe, Ohio, a corporation of Ohio
No Drawing. Filed May 20, 1960, Ser. No. 30,447
13 Claims. (Cl. 260—139)

This invention relates to an improved process for the conversion of certain olefin polymers to acidic products. It relates in a more particular sense to such a process which makes available lighter colored acidic products than have been available heretofore. This application is a continuation-in-part of copending application Ser. No. 689,039, filed October 9, 1957.

The reaction of olefin polymers with inorganic phosphorus- and sulfur-containing reagents has long been known as a convenient source of acidic products which are useful as intermediates in the preparation of a wide variety of commercially attractive compositions. Generally these acidic products are reacted further with metal bases to produce the corresponding metal salts and these metal salts then are used in such applications as the rust-proofing of ferrous metal surfaces, inhibitors of corrosion in crankcase lubricants, paint driers, stabilizers of vinyl chloride polymers, and many other commercial uses. In almost all of these commercial uses it is desirable and frequently necessary that the metal salt of the phosphorus- and sulfur-containing acidic product of this process be light in color. The reason for this, of course, is that a light-colored product of any sort is more appealing to the buyer than a similar dark-colored product.

Many different types of products are available from the reaction of olefin polymers with phosphorus- and sulfur-containing inorganic reagents. These differences are associated with the differences in types of phosphorus- and sulfur-containing reagents. Thus these reagents may include phosphorus pentasulfide, thiophosphoryl chloride, phosphorus trisulfide, a combination of phosphorus trichloride and sulfur, and many others. The latter, a combination of phosphorus trichloride and sulfur, may be reacted with olefin polymers to give a particularly useful product which may be further treated with steam and then with a basic neutralizing agent to yield a product useful as an additive in crankcase lubricants. Such a product, i.e., the final metal salt, must as indicated above have a desirably light color to be acceptable to those who formulate the finished crankcase lubricant, and it has been noted that metal salts prepared by the reaction of an olefin polymer with phosphorus trichloride and elemental sulfur are characterized by a somewhat darker shade of color than that which is ordinarily acceptable to the trade. The performance characteristics of this metal salt when used as an additive for crankcase lubricants are excellent, however, so that this material is useful in spite of its unsatisfactory color.

It is apparent that an improvement in the color of such a product would enhance its usefulness to a marked degree and it is accordingly a principal object of this invention to provide an improved process for the preparation of phosphorus- and sulfur-containing metal salts.

A further object of the present invention is the provision of a metal salt of a phosphorus- and sulfur-containing acid characterized by a relatively light color.

A further object of the present invention is the provision of a process comprising the reaction of an olefin polymer with phosphorus trichloride and sulfur, followed by treatment with steam, to produce a light-colored acidic product.

These and other objects are accomplished by the process for the preparation of phosphorus- and sulfur-containing acids which comprises preparing a mixture of a polymer of a lower mono-olefin, from about 0.5 to about 5.0 moles of sulfur, from about 0.001 to about 0.1 mole of a metal salt of a phosphorodithioic acid selected from the group consisting of barium, zinc, copper and sodium salts thereof, from about 0.5 to about 5.0 moles of a phosphorus halide, heating said mixture at a temperature within the range of about 140° C. to about 250° C., and then treating the resulting mass with steam at a temperature within the range of about 110° C. to about 200° C.

The various reactants mentioned above may be mixed in any order. A preliminary mixture of some of the reactants may be prepared first, then heated and then the remaining reactants added. One or more of the reactants may be added portionwise to a mixture of the other reactants. One preferred method consists of mixing all of the reactants at room temperature and then raising the temperature of this mixture to the range within which the desired reaction takes place, viz., from about 140° C. to about 250° C. In this particular version of the process it is necessary to employ an efficient reflux condenser because the minimum reaction temperature exceeds the boiling point of the phosphorus trichloride reactant. An advantage of this version of the process is that the phosphorus trichloride reactant is reacted more "efficiently," i.e., the product prepared in this manner contains more phosphorus per unit of phosphorus trichloride used as a reactant than a product prepared by other versions of this process.

Another preferred version of the process of the invention consists of mixing all of the reactants except phosphorus trichloride, heating this mixture to the desired reaction temperature and then adding the phosphorus trichloride portionwise as it is reacted. A notable advantage of this version of the process is that the reaction can be carried out at a relatively high temperature and thus can be completed in a correspondingly short period of time.

Alternatively, however, the phosphorus and sulfur containing acids may also be prepared by mixing the sulfur, phosphorus trichloride, metal phosphorodithioate and olefin polymer at room temperatures and subsequently heating, under reflux conditions, to optimum temperatures above 140° C. It was particularly noted that when all the ingredients were mixed at room temperature and then heated above 140° C., with refluxing, the reaction time required was considerably less in the presence of the metal phosphorodithioate. Moreover, when all the ingredients were mixed at room temperature and then heated above the reaction temperature the amount of phosphorus uptake in the final product increased as compared to when the phosphorus trichloride was added to the heated mixture.

The ultimate problem of color with respect to the products of this invention is associated with the color of the metal salt of the acidic product of the above process. The color of the product of the above process, however, is a direct indication of the color of the metal salt which results from such acidic product, viz., if the acidic product is light in color then the metal salt prepared from this acidic product will likewise be light. The problem of color of the metal salt therefore can be solved by improving the color of the acidic product from which the metal salt is prepared.

The polymeric reactant of the process of this invention is a polymer of a lower mono-olefin, viz., a polymer of ethylene, propylene, butene-1, or isobutylene. In most cases this polymer is a homopolymer of isobutylene and the molecular weight of this homopolymer is within the range of 250–50,000. Especially suitable polymeric reactants are those having molecular weights between about 250 and about 3,000. Other polymers, including copolymers are also contemplated, but such copolymers are those characterized by a large proportion of lower mono-olefin units. Thus such copolymers are exemplified by copolymers of 90% isobutylene and 10% styrene, i.e., where the percentage of the second monomer unit is relatively small. Other homopolymers of lower mono-olefins are also contemplated. Lower molecular weight polyisopropylenes and polyethylenes have been found to be useful in this process and they are included within the scope of the invention.

The lower molecular weight polyisobutylenes which are preferred as the polymeric reactant, for reasons of solubility and viscosity of the reaction products in mineral oil, are readily available materials and can be prepared conveniently by polymerization of isobutylene at temperatures within the range of about $-60°$ C. to about $40°$ C. in the presence of an ionic catalyst such as boron fluoride. The preparation of such low molecular weight polymers is exemplified by the following process: A hydrocarbon mixture containing about 25% of isobutylene is cooled to about $-15°$ C. and from about 0.1% to about 2% of boron fluoride, based upon the isobutylene content of the material treated, is added with vigorous agitation. The exothermic nature of the polymerization causes it to require efficient cooling. When the polymerization has subsided the reaction mass is neutralized and washed free of acidic substances arising from the catalyst. The resulting polymer is separated from the unreacted hydrocarbons by distillation. The residual polymer so obtained, depending upon the temperature of reaction, contains polymeric chains having molecular weights within the range of 100 to 2000.

The mechanism of the process is believed to involve first a reaction of the olefin polymer with the sulfur resulting in sulfurization of the polymer followed by reaction of this sulfurized polymer with the phosporus trichloride. The presence of the relatively small amount of the metal phosphorodithioate constituent is responsible for the improved color of the product which results. The relative amounts of the reactants may be varied within wide limits. Approximately equimolar proportions appear to be the optimum, but, considering the amount of polymer as one mole, the amount of sulfur may be varied within the range of about 0.5 to about 5.0 moles. Also the amount of phosphorus trichloride may be varied within this same numerical range. The preferred amount of sulfur is 1.25 mole (per mole of polymer), and the preferred amount of phosphorus trichloride is 1.0 mole. With respect to the amount of metal phosphorodithioate which is to be used, this material is effective in very small proportions up to a maximum of about 0.1 mole (per mole of polymer). The range of proportions of this ingredient is about 0.001 to about 0.1 mole. A particularly preferred concentration of this metal phosphorodithioate constituent is about 0.012 mole thereof per mole of polymer.

The process is carried out usually either by adding phosphorus trichloride to a mixture of sulfur, olefin polymer and metal phosphorodithioate or alternatively by adding, concurrently, the sulfur and phosphorus trichloride to a mixture of the polymer and metal phosphorodithioate. The sulfur, likewise, may be added portionwise to the process mixture. The order and temperature at which the individual components may be added to the reaction mass is not critical, so long as the total mass is heated above the reaction temperature of $140°$ C.

In view of the fact that phosphorus trichloride boils at a temperature considerably below the minimum reaction temperature of $140°$ C., it is frequently desirable to add the phosphorus trichloride portionwise to the hot reaction mixture. Furthermore the reaction vessel should ordinarily be equipped with means for returning volatilized unreacted phosphorus trichloride to the system and such means in most cases can be provided by a reflux condenser. In order to minimize the loss of unreacted phosphorus trichloride from the process mixture it also is desirable in many cases to add this reagent by introducing it beneath the surface of the reaction medium, thereby causing it to bubble up through the mixture. The temperature limits within which the process of this invention may be carried out range from about $140°$ C. to about $250°$ C. The lower temperature is that minimum which is required for a satisfactory rate of reaction; the higher temperature represents the practical upper limit of the range. Higher temperatures such as $300°$ C. or even higher may be employed, but with no advantage and in some cases with the attendant disadvantage of some decomposition of the constituents of the process mixture.

Phosphorus halides other than phosphorus trichloride can be used in the process. Phosphorus tribromide is especially useful because of its relatively high boiling point. When using phosphorus tribromide it is preferable to mix the reactants at room temperature and then heat the mixture to reaction temperature.

The metal phosphorodithioate component of the reaction mass of this invention may be a barium, zinc, copper or sodium salt of a phosphorodithioic acid; especially preferred are the barium and zinc salts.

The phosphorodithioic acid residue of the metal phosphorodithioate reaction component is derived from the reaction of phosphorus pentasulfide with 4 moles of an alcohol or a phenol. A wide variety of alcohols and phenols may be employed in such a process for the purposes of this invention. Generally, for reasons of availability, these alcohols or phenols will be the simpler unsubstituted compounds such as ethanol, isobutyl alcohol, the various octyl alcohols, dodecanol, ispropyl phenol, diisobutyl phenol, etc.: although such substituted alcohols and phenols as ethylene chlorohydrin, 2,4-dichlorophenol, etc. may also be used to provide suitable phosphorodithioic acids from which the metal phosphorodithioate reactant of the process of this invention may be prepared.

The product which results from the reaction of an olefin polymer with elemental sulfur and phosphorus trichloride, as above described, contains phosphorus, sulfur and chlorine. The chlorine is fairly reactive. Treatment of this product with steam at a temperature within the range of $110°$ C. to about $200°$ C. results in hydrolysis of most of the chlorine and removal also of a considerable proportion of the sulfur. Although it has been found that the minimum temperature of $110°$ C. is entirely satisfactory with respect to achieving these results, as a matter of convenience this steam treatment generally is carried out at a higher temperature because the preceding step in the process must be carried out at a temperature within the above stated range of $140-250°$ C. It is apparent that the following steam treatment step may be carried out more conveniently at the same temperature as that of the preceding step. This generally is about $160-190°$ C.

The invention may be illustrated in more detail by the following examples in which the NPA color rating is a numerical index of the color of a sample as determined by visual comparison of a 5% solution (in oil) of the sample with a series of different colored standards ranging from a light lemon colored standard having a rating of 1 to a deep red standard having a rating of 8. The oil used as the solvent for the samples has a rating of 1.5.

*Example 1*

A mixture of 4000 grams (5.3 moles) of polyisobutylene having an average molecular weight of 750, 213 grams (6.7 moles) of sulfur, 134 grams (0.066 mole) of the barium salt of a phosphorodithioic acid prepared by the reaction of phosphorus pentasulfide and an alcohol mixture consisting of 50 mole percent of capryl alcohol, 37.5 mole percent of 4-methyl-2-pentyl alcohol, and 12.5 mole percent of cyclohexyl alcohol, was heated to $150°$ C. To this mixture there was added portionwise 740 grams (5.3 moles) of phosphorus trichloride at 160–165° C. during a period of 6 hours. After the addition, the mixture was heated at 160–165° C. for 3 hours and then at 160° C./30 mm. for 1.5 hours. The residue was diluted with 2000 grams of mineral oil. Steam was passed through the mixture at 150–160° C. for 2 hours. The hydrolyzed product was then dried by heating at 150–160° C./28 mm. for 2 hours and was found to have the following analysis:

| | |
|---|---|
| Percent P | 2.1 |
| Percent S | 1.65 |
| NPA color | 4.5 |

*Example 2*

To a mixture of 64 grams (2 moles) of sulfur, 750 grams (1 mole) of polyisobutylene having an average molecular weight of 750, and 25 grams (0.0125 mole) of the barium salt of a phosphorodithioic acid prepared as in Example 1, there was added portionwise at 150–155° C. 276 grams (2 moles) of phosphorus trichloride during a period of 4 hours. After the addition the mixture was heated at 150–160° C. for 5 hours and then at 160–165° C./28 mm. for 1 hour. The residue was diluted with 375 grams of mineral oil and treated with steam at 150–165° C. for 2 hours. The hydrolyzed product was dried at 145–155° C./28 mm. for 1 hour and had the following analysis:

| | |
|---|---|
| Percent P | 3.6 |
| Percent S | 2.3 |
| NPA color | 4.5 |

*Example 3*

A mixture of 40 grams (1.25 moles) of sulfur, 750 grams (1 mole) of polyisobutylene having an average molecular weight of 750, and 315 grams (0.0125 mole) of cuprous diisopropyl phosphorodithioate, was heated to 155° C. To this mixture there was added portionwise at 160–165° C. 138 grams (1 mole) of phosphorus trichloride during a period of 2.5 hours. The mixture was heated at 160–165° C. for 2 hours and then at 145–165° C./20 mm. for 1 hour. The residue was diluted with 375 grams of mineral oil, and steam was passed through the mixture at 155–165° C. for 2 hours. After being dried at 145–165° C./25 mm. for 2 hours, the hydrolyzed product was found to have the following analysis:

| | |
|---|---|
| Percent P | 2.1 |
| Percent S | 1.2 |
| NPA color | 4.5 |

*Example 4*

Sodium diisopropyl phosphorodithioate (11.8 grams, 0.05 mole) and sulfur (40 grams, 1.25 moles) were added to 750 grams (1 mole) of polyisobutylene having an average molecular weight of 750. To this mixture there was added at 160–165° C. 138 grams (1 mole) of phosphorus trichloride during a period of 2.5 hours. The mixture was heated at 160–165° C. for 10 hours, at 150–155° C./20 mm. for 1 hour, diluted with 375 grams of mineral oil, and hydrolyzed by passing steam through the mixture at 145–160° C. for 2 hours. It was then dried by heating at 160–165° C./20 mm. for 1 hour and filtered. The filtered product had the following analysis:

| | |
|---|---|
| Percent P | 2.0 |
| Percent S | 1.5 |
| NPA color | 5 |

*Example 5*

A mixture of 40 grams (1.25 moles) of sulfur, 750 grams (1 mole) of polyisobutylene having a molecular weight of 750, and 8 grams (0.0125 mole) of barium di-(heptylphenyl) phosphorodithioate was heated to 160° C. To this mixture there was added at 165° C. 138 grams (1 mole) of phosphorus trichloride. The mixture was heated at 165° C. for 3 hours, at 170° C. for one-half hour, and was diluted with 375 grams of mineral oil. Steam was then passed through the mixture at 160° C. for 2 hours. The mixture was dried by heating at 160° C., filtered, and was found to have the following analysis:

| | |
|---|---|
| Percent P | 2.1 |
| Percent S | 1.9 |
| NPA color | 4 |

*Example 6*

To a mixture of 23 grams (0.047 mole) of zinc diisopropyl phosphorodithioate, 750 grams (1 mole) of polyisobutylene having an average molecular weight of 750, and 48 grams (1.5 moles) of sulfur, there was added at 165° C. 138 grams (1 mole) of phosphorus trichloride. The mixture was heated at 160–165° C. for one hour and at 160° C./20 mm. for 2 hours. Mineral oil (375 grams) was added to the residue, and steam was passed through the mixture at 160–165° C. for 2 hours. The hydrolyzed product was then dried by heating at 130–150° C. for one-half hour with 30 grams of diatomaceous earth and filtered. The filtrate had the following analysis:

| | |
|---|---|
| Percent P | 1.7 |
| Percent S | 1.5 |
| NPA color | 5 |

*Example 7*

To a mixture of 750 grams (1 mole) of polyisobutylene having an average molecular weight of 750, 32 grams (1 mole) of sulfur, and 48 grams (0.1 mole) of zinc diisopropyl phosphorodithioate, there was added 138 grams (1 mole) of phosphorus trichloride during a period of 1 hour. The reaction mass was heated at 175–180° C. for 2 hours and then at 175° C./50 mm. for 1 hour. Mineral oil (376 grams) was added to the residue, and steam was passed through the mixture at 165° C. for 2 hours. The hydrolyzed product was dried by heating at 160° C. for one-half hour and filtered. The filtrate had the following analysis:

| | |
|---|---|
| Percent P | 2.4 |
| Percent S | 1.1 |
| NPA color | 3.5 |

*Example 8*

A mixture of 589 grams (0.71 mole) of a polyisobutylene having an average molecular weight of 832, 97.5 grams (0.71 mole) of phosphorus trichloride, 28.3 grams (0.88 mole) of sulfur and 18 grams (0.0088 mole) of a 40% mineral oil solution of the barium salt of a phosphorodithioic acid obtained from the reaction of phosphorus pentasulfide and 4 moles of an alcohol mixture consisting of 50 mole percent of capryl alcohol, 37.5 mole percent of 4-methylpentanol-4 and 12.5 mole percent of cyclohexyl alcohol, was prepared at room temperature and then heated with stirring to 134° C. over a period of one hour. Stirring was continued while the temperature was increased to 151° C. over a period of 4.5 hours, and held at 151° C. to 159° C. for a period of 7.3 hours. The product was distilled at 125° C.–153° C./20 mm., yielding 53 grams of distillate, and then subsequently steam-treated for 2 hours at 150° C.–170° C. The hydrolyzed product was then dried. The dried product was filtered and the filtrate found to have the following analysis:

| | |
|---|---|
| Percent P | 1.05 |
| Percent S | 0.75 |
| NPA color | 4.0 |

The above eight examples illustrate the process of this invention. An understanding of the effectiveness of this process can be gained by comparison of the color of the products of this process with the color of products prepared by processes of the prior art. Examples 9, 10 and 11 show such a process.

*Example 9*

To a mixture of 64 grams (2 moles) of sulfur and 750 grams (1 mole) of polyisobutylene having an average molecular weight of 750, there was added portionwise at 150–155° C., 276 grams (2 moles) of phosphorus trichloride during a period of 4 hours. The mixture was heated at 150–160° C. for 5 hours and then at 160° C./28 mm. for 1 hour. The residue was diluted with 375 grams of mineral oil, and steam was passed through the mixture at 150–160° C. for 2 hours. The product was dried by heating at 150–160° C./28 mm. for 1.5 hours and had the following analysis:

Percent P _____ 3.2
Percent S _____ 1.4
NPA color _____ 8

*Example 10*

A mixture of 40 grams (1.25 moles) of sulfur and 750 grams (1 mole) of polyisobutylene having an average molecular weight of 750 was heated to 160° C. To this mixture there was added portionwise at 160–165° C. 138 grams (1 mole) of phosphorus trichloride during a period of 3 hours. The mixture was heated at 160–165° C. for 3 hours and then at 150–160° C./35 mm. for 1.5 hours. The residue was diluted with 375 grams of mineral oil, and steam was passed through the mixture at 145–160° C. for 2 hours. The product was then dried by heating at 150–155° C./35 mm. for 1 hour and was found to have the following analysis:

Percent P _____ 1.9
Percent S _____ 1.6
NPA color _____ 6.5

*Example 11*

A mixture of 589 grams (0.71 mole) of a polyisobutylene having an average molecular weight of 832, 97.5 grams (0.71 mole) of phosphorus trichloride and 28.3 grams (0.88 mole) of sulfur was prepared at room temperature and then heated with stirring to 135° C. over a period of one hour. Stirring was continued while the temperature was increased to 145° C., with refluxing, over a period of 14.2 hours and held at 150° C.–157° C. for 5 hours. The products was distilled at 155° C./20 mm., obtaining 52 grams of distillate and then subsequently steam-treated for 2 hours at 155° C.–170° C. The hydrolyzed product was then dried. The dried product was filtered and the filtrate found to have the following analysis:

Percent P _____ 1.0
Percent S _____ 0.5
NPA color _____ 6

It will be noted that the products of this invention have NPA color ratings ranging from 3.5 to 5 whereas the NPA color ratings of the three products of Examples 9, 10 and 11 (the prior art processes) are 8, 6.5 and 6 respectively. An acceptable product for the trade should have a NPA color rating no greater than 5.

A further advantage which characterizes the herein described process is associated with the utilization of the phosphorus trichloride reactant in the process. Thus a greater percentage of the phophorus trichloride used is found as phosphorus in the ultimate product. The advantages of this feature are evident. In some instances this increased utilization of phosphorus trichloride is as high as 30% over that which may be observed in the case of prior art processes.

Other modes of applying the principle of the invention may be employed, change being made as regards the details described, provided the features stated in any of the following claims or the equivalent of such be employed.

We therefore particularly point out and distinctly claim as our invention:

1. A process for the preparation of phosphorus and sulfur-containing acids which comprises preparing a mixture of one mole of a polymer of a lower mono-olefin, about 0.5 to 5.0 moles of sulfur, about 0.5 to 5.0 moles of a phosphorus trihalide and about 0.001 to 0.1 mole of a metal salt of a phosphorodithioic acid, said metal salt being selected from the group consisting of barium, zinc, copper and sodium salts thereof, heating said mixture to a temperature above 140° C., and then treating the resulting mass with steam at a temperature within the range of about 110° C. to 200° C.

2. The process of claim 1 characterized further in that the olefin polymer is a polymer of isobutylene.

3. The process of claim 2 characterized further in that the olefin polymer is a polymer of isobutylene having a molecular weight within the range of 250 to 3000.

4. The process of claim 1 characterized further in that the metal salt is a barium salt.

5. The process of claim 1 characterized further in that the metal salt is a zinc salt.

6. The process of claim 1 characterized further in that the metal salt is a copper salt.

7. The process of claim 1 characterized further in that the metal-salt is a sodium salt.

8. The process of claim 1 characterized further in that the phosphorus trihalide is phosphorus trichloride.

9. The process of claim 8 characterized further in that the phosphorus trichloride and sulfur are added portionwise and simultaneously to the mixture.

10. The process of claim 8 characterized further in that the mixture is prepared within the range of room temperature up to about 140° C.

11. A process for the preparation of phosphorus and sulfur-containing acids which comprises preparing a mixture of about 750 parts by weight of a polymer of a lower monoolefin, about 16 to 160 parts by weight of sulfur, about 69 to 690 parts by weight of phosphorus trichloride and a catalytic amount of a metal salt of a phosphorodithioic acid, said metal salt being selected from the group consisting of barium, zinc, copper and sodium salts thereof, heating said mixture at a temperature above 140° C., and then treating the resulting mass with steam at a temperature within the range of about 110° C. to 200° C.

12. A process for the preparation of phosphorus and sulfur-containing acids which comprises preparing a mixture of one mole of a polymer of isobutylene, about 1.25 moles of sulfur, about 1.0 moles of phosphorus trichloride and about 0.012 mole of a metal salt of a phosphorodithioic acid said metal salt being selected from the group consisting of barium, zinc, copper and sodium salts thereof, heating said mixture at a temperature above 140° C. and then treating the resulting mass with steam at a temperature within the range of about 110° C. to about 200° C.

13. The product obtained by the process of claim 1.

References Cited in the file of this patent

UNITED STATES PATENTS 2,900,378     Miller _____ Aug. 18, 1959
2,938,894     Smalheer et al. _____ May 31, 1960